United States Patent [19]

McLemore, Jr. et al.

[11] Patent Number: 5,100,089
[45] Date of Patent: Mar. 31, 1992

[54] MASON LEVEL HOLDER

[76] Inventors: Charles E. McLemore, Jr., 1064 Lorlyn Cir., Apt. 2C, Batavia, Ill. 60510; James W. Potthast, 3200 N. Lake Shore Dr., #2305, Chicago, Ill. 60657

[21] Appl. No.: 624,202

[22] Filed: Dec. 6, 1990

[51] Int. Cl.⁵ .............................................. A47B 96/06
[52] U.S. Cl. ................................ 248/231.7; 211/59.1; 248/314
[58] Field of Search ............... 248/231.8, 314, 231.7; 24/570, 3 F, 3 L; 33/370, 374, 371, 373; 211/59.1, 57.1

[56] References Cited

U.S. PATENT DOCUMENTS

| 160,127 | 2/1875 | Taylor | 211/59.1 X |
|---|---|---|---|
| 1,527,042 | 2/1925 | Gaut . | |
| 2,367,256 | 1/1945 | Atkins . | |
| 2,564,389 | 8/1951 | Boehm et al. . | |
| 2,647,712 | 8/1953 | Sandmoen . | |
| 2,683,640 | 7/1954 | Mangine . | |
| 2,726,837 | 12/1955 | Jameson . | |
| 3,021,106 | 2/1962 | Kramer . | |
| 3,131,900 | 5/1964 | Anderson et al. . | |
| 3,141,257 | 7/1964 | Stull . | |
| 3,182,943 | 5/1965 | Crossman . | |
| 3,744,645 | 7/1973 | Hochman . | |
| 3,876,078 | 4/1975 | Gomes et al. . | |
| 3,949,880 | 4/1976 | Fortunato . | |
| 3,978,610 | 9/1976 | Stubbmann | 248/231.8 X |
| 3,991,961 | 11/1976 | Platzer, Jr. . | |
| 4,066,232 | 1/1978 | Hermeyer | 248/231.5 |
| 4,253,576 | 3/1981 | Ford | 211/59.1 X |
| 4,270,721 | 6/1981 | Mainor, Jr. . | |
| 4,282,976 | 8/1981 | Fitzgerald | 211/59.1 |
| 4,496,058 | 1/1985 | Harris | 248/231.8 X |
| 4,821,988 | 4/1989 | Jimenez | 248/231.8 X |
| 4,903,929 | 2/1990 | Hoffman . | |

FOREIGN PATENT DOCUMENTS 815488  7/1937  France ........................... 211/59.1

Primary Examiner—J. Franklin Foss
Attorney, Agent, or Firm—Potthast & Ring

[57] ABSTRACT

A level holder (10, 10') with a level holding assembly (14, 14') has slots (22, 26, 28, 30) or pegs (58, 60) capable of supporting a level in two different orientations relative to the level holding assembly (14, 14') and a mounting assembly (38, 38') for attaching the level holding assembly to either vertical or horizontal scaffolding members (34, 32) associated with the two different orientations enabling the level holding assembly (14, 14') to support one or more levels (16) in a substantially vertical position regardless of whether attached to a vertical or horizontal member. In one form of the mounting assembly (38) a lateral member (28) used to provide underlying support for a level (16) also functions as one side of a C-clamp assembly (40, 42, 44, 46, 48, 50, 52). In another form of the mounting assembly (38'), another C-clamp having a pair of nonpivotal, resilient arms (64, 66) adapted for attachment to either cylindrical vertical members (34) or planar members (32) is used for attachment.

16 Claims, 2 Drawing Sheets

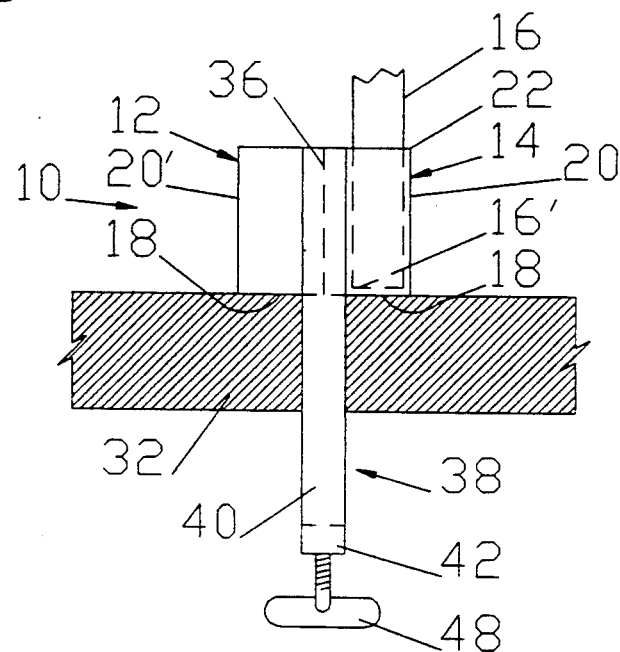
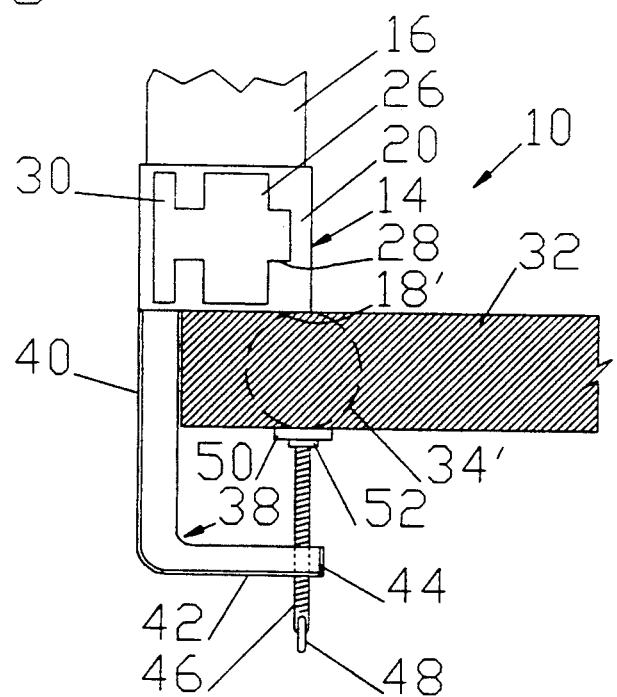

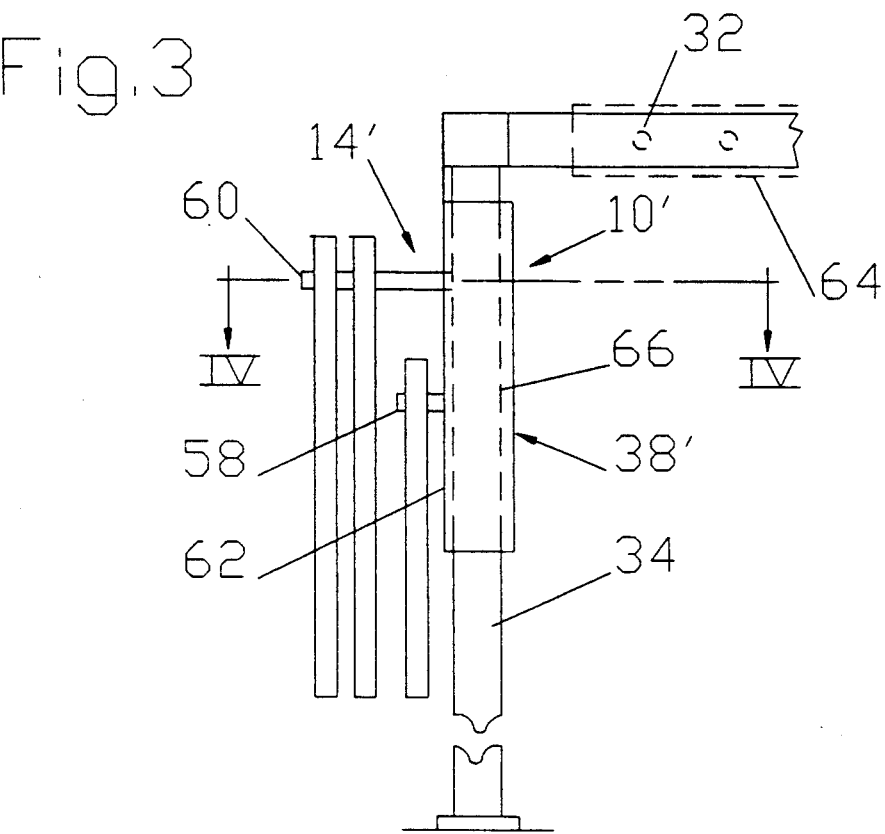
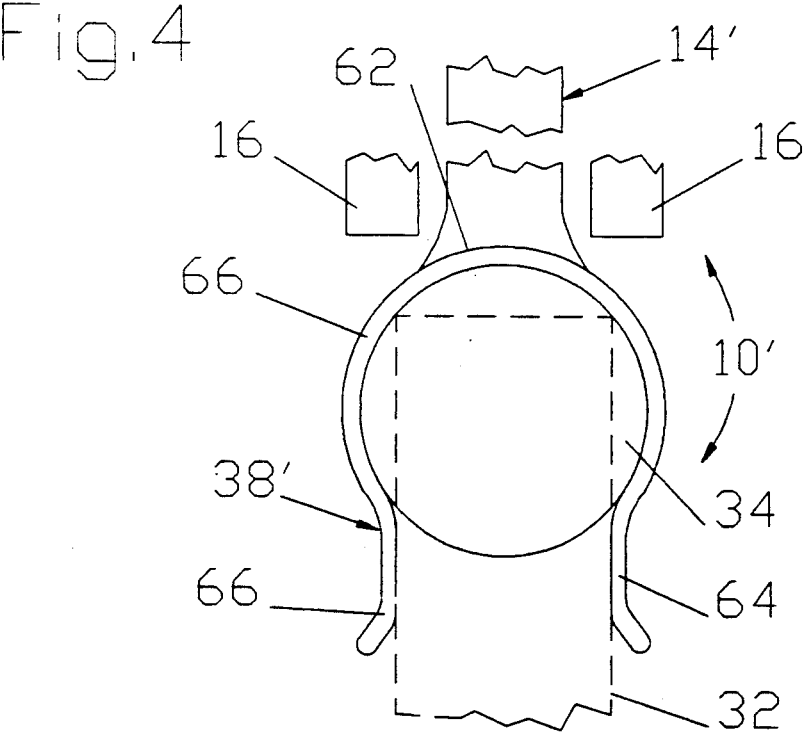

MASON LEVEL HOLDER

TECHNICAL BACKGROUND

This invention relates to an apparatus for releasably holding mason's levels, or levels, to part of a work table formed by scaffolding members or the like.

In the course of building a wall or the like, masons must regularly check to make sure that the structure they are building is vertical along the edge or side and horizontal along the top. This is achieved through use of one or more elongate, straight levels which carry one or more water filled bubble tubes. Each bubble tube has an air bubble which becomes located at the center of the tube when the tube is horizontal. One or more of the bubble tubes are aligned with the elongate axis of the level to ascertain a horizontal line, and one or more are extended transversely of the elongate axis of the level to ascertain a vertical line. Conventional levels often have a multiplicity of circular cut outs along their length to reduce the body weight of the level.

Since such levels are often too long to conveniently carry on a tool belt or the like and are delicate instruments which can be easily damaged, it has been known to provide level holders. Known level holders releasably mount the level to a horizontal scaffolding member, or mortar board. In U.S. Pat. No. 2,647,712 of Sandmoen issued Aug. 4, 1953, a box-shaped member for holding the end of a level in an upright position is secured to a board by means of a pair of winged screws. In U.S. Pat. No. 4,066,232 of Hermeyer issued Jan. 3, 1978, a box-shaped member for holding the end of a level in an upright position is secured to the edge of a scaffolding board, mortar board, work bench or the like by means of a pivotal clamp which is hinged to the edge of the box-shaped holding member.

While not relating to level holders, other apparatus are known for mounting other types of tool holders and the like to the edges of boards or the like. In U.S. Pat. No. 1,527,042 issued Feb. 17, 1927 to Gaut, an ash tray, napkin holder and glass holder are attached to the edge of a table by means of a threadably adjustable C-clamp. Similar clamps are shown in U.S. Pat. No. 2,367,256 issued Jan. 16, 1945 to Atkins (paint bucket holder); U.S. Pat. No. 2,564,389 issued Aug. 14, 1951 to Boehm et al. (fish stringer holder); U.S. Pat. No. 2,683,640 issued July 13, 1954 to Mangine (palette attachment for drawing table tops); U.S. Pat. No. 2,726,837 issued Dec. 13, 1955 to Jameson (receptacle holder); U.S. Pat. No. 3,021,106 issued Feb. 13, 1962 to Kramer (drinking cup holder); U.S. Pat. No. 3,131,900 issued May 5, 1964 to Anderson et al. (paint bucket holder); U.S. Pat. No. 3,141,257 issued July 21, 1964 to Stull (live fish container); U.S. Pat. No. 3,182,943 issued May 11, 1965 to Crossman (paint can and brush holder); U.S. Pat. No. 3,567,038 issued Mar. 2, 1971 to Ammann (bin holder); U.S. Pat. No. 3,744,645 issued July 10, 1973 to Hochman (auxiliary display receptacle); U.S. Pat. No. 3,876,078 issued Apr. 8, 1975 to Gomes et al. (portable gun rack); U.S. Pat. No. 3,949,880 issued Apr. 13, 1976 to Fortunato (shelf extender); U.S. Pat. No. 3,991,961 issued Nov. 16, 1976 to Platzer, Jr. (collapsible support structure); U.S. Pat. No. 4,270,721 issued June 2, 1981 to Mainor, Jr. (instrument support) and U.S. Pat. No. 4,903,929 issued Feb. 27, 1990 to Hoffman (portable apparatus for holding objects).

There are several disadvantages associated with the level holders of U.S. Pat. No. 2,647,712 of Sandmoen and U.S. Pat. No. 4,066,232 of Hermeyer, both of which teach away from the use of clamps, such as the C-clamp type noted above with particular reference to U.S. Pat. No. 1,527,042 of Gaut. In the holder of Sandmoen, the level holder will function only if fastened to a iven into the horizontal surface. When they can be driven into the surface, the screw fasteners damage or permanently ar the surface. The clamp of Hermeyer, likewise enables the level holder to be mounted to only a horizontal surface, and because it is a pivotal clamp, the thickness of the edge of any planar member and the shapes of other members to which it can be attached is severely limited.

In summary, none of the known level holders have any means suitable for mounting the level holder to a vertical scaffolding member or, for alternatively mounting a level to both a vertical member and a horizontal member or to members of different shapes. In addition, none are capable of mounting and holding more than one level at a time.

SUMMARY OF THE INVENTION

It is therefore the principal object of the present invention to provide a level holder which overcomes the above disadvantages by providing apparatus for selectively mounting a level holder to either a vertical or a horizontal member and which are adaptable for mounting to members of different shapes and orientations.

This object of the invention is achieved by providing a level holder with a level holding assembly for selectively supporting an elongate level in different orientations relative to the assembly and a mounting assembly for selectively attaching said level holding assembly to scaffolding members which extend in two different directions respectively associated with said two different orientations relative to the level holding assembly to enable the level holding assembly to support the elongate level in a substantially vertical orientation regardless of the direction of the scaffolding member to which the mounting assembly is attached. Preferably, the level holding assembly has capacity for holding a plurality of levels.

A further object of the invention is achieved by providing a level holder with a level holding assembly for supporting an elongate level in a vertical orientation and a mounting assembly for releasably mounting the level holding assembly to a scaffolding member including a generally C-shaped clamp having a base with a pair of opposite sides, means for attaching the level holding assembly to one side of the pair of opposite sides of the base, a pair of resilient arms and means for nonpivotally securing the pair of resilient arms to the base in spaced, opposed relationship to resiliently hold therebetween a scaffolding member. In the preferred embodiment, the arms have different positions for attachment to members of different shapes.

Still a further object is achieved by providing a level holder with at least one level holding assembly including a lateral member for providing vertical support for an elongate level, and a mounting assembly for releasably mounting the level holding assembly to the edge of a scaffolding member including a generally L-shaped subassembly with a standard connected with the level holding assembly and a cross member. The cross member extends substantially transversely from the standard to a location spaced oppositely of the lateral member of the level holding assembly to define a space therebetween for receipt of a scaffolding member. A clamp member is mounted to the cross member for nonpivotal movement substantially parallel to the standard to clamp the scaffolding member between the clamp member and the lateral

BRIEF DESCRIPTION OF THE DRAWINGS

The foregoing objects and advantageous features of the invention will be explained in greater detail and others will be made apparent from the detailed description of the preferred embodiment of present invention which is given with reference to the several figures of the drawing, in which:

FIG. 1 is an end view of the preferred embodiment of a first type of level holder of the present invention;

FIG. 2 is a side view of the level holder of FIG. 1;

FIG. 3 is a side view of the preferred embodiment of a second type of level holder of the present invention; and FIG. 4 is an enlarged sectional view of the level holder taken along section line IV—IV of FIG. 3.

DESCRIPTION OF THE PREFERRED EMBODIMENT

Referring now to FIGS. 1 and 2, a preferred embodiment 10 of the first type of level holder of the present invention is seen to include a pair of level holding assemblies 12 and 14 each of which is designed to hold one elongate level 16 having a generally rectangular cross section. Each of the level holding assemblies 12 and 14 has a lateral member 18 for providing underlying support for an end 16' of a level 16 to support it in an upright, or vertical, orientation, extending upwardly from the level holding assembly 12. The level holding assembly 12 also has one or more, preferably four, elongate upright members, or walls 20 joined at four corners to form a box of which the bottom is preferably defined by the lateral, underlying support member 18. The distal end 22 of the box opposite the vertical underlying support 18 is open on all four sides, as illustrated in FIG. 1, or, preferably, is slotted having one or more parallel or transverse rectangular slots, such as slots 26, 28 and 30, illustrated in FIG. 2.

In the case of slots such as slots 26, 28 and 30, the slots are preferably of different sizes to accommodate levels of different common dimensions. However, slots of the same size can be employed to accommodate two levels of the same standard dimension. Preferably, the slots are beveled at their openings to facilitate entry of the end of the level into and through the slot openings.

While slots or wall-to-wall openings (which may be considered a type of slot) are shown on only wall 20 of level holding assembly 14, it should be appreciated that the side wall 20' of level holding assembly 12 can also be provided with slots similar or identical to slots 26, 27 and 28.

In either event, the slots or wall-to-wall openings, as the case may be, in one or both of the side walls 20, 20' face in a direction which is transverse to the direction faced by the wall-to-wall opening or slots at the distal end 22 of the level holding assembly.

This feature advantageously enables the level holder 10 to be releasably mounted to a horizontal scaffolding member 32, as shown in FIG. 1, or to a vertical scaffolding member 34, shown in FIG. 3 and 4 and indicated in cross section by broken line illustrations 34' in FIG. 2. In the case of the level holder assemblies 12 and 14 being mounted to a vertical member 34, the slots 26, 28 and 30 face in a vertical direction and are used to laterally support the level 16 in an upright position while the slot in the distal end 22 is not used.

Preferably, a wall shown by broken line 36, FIG. 1, separates the two level holding assemblies 12 and 14. Alternatively, wall 36 is eliminated to provide a greater depth of the box for greater lateral support when the level holding assemblies 12 and 14 are mounted to a vertical member 34'. In either event, one or more slots is provided in level holder assembly 12 which are of the same or different sizes as slots 26, 28 and 30 of FIG. 2. In such event, the slots 26, 28 and 30 are misaligned with the slots in side wall 20' and each of walls 20 and 20, perform the function of the 12 and 14 are mounted to a vertical member instead of the wall 36 performing this function.

As seen in FIG. 1 and 2, the preferred means of mounting the level holding assemblies 12 and 14 includes a generally L-shaped clamp assembly 38 to selectively, releasably mount the level holding assemblies 12 and 14 to a horizontal scaffolding member 32 or to a vertical scaffolding member 34. The L-shaped clamp assembly 38 includes an elongate standard 40 which is connected to the back of the level holding assemblies 12 and 14, preferably by a bond integrally formed therewith. A cross member 42 extends substantially transversely from the distal end of the standard 40 in a direction parallel to the level holding assemblies 12 and 14. Specifically, the cross member extends to a distal end 44 at a location which is spaced oppositely of the lateral member 18 of the level holding assemblies 12 and 13 to define a space or gap the vertical member 34 or 34'.

The cross member 42 at the distal end 44 carries an clamp member 46 mounted, preferably threadably mounted, through an opening for movement substantially , parallel to the standard 40 to clamp the scaffolding member 32 or 34' between the end of the clamp member 46 and the lateral support member 18. Thus, the lateral member 18 advantageously functions not only as the mating clamp member for pad 50, it also serves as the underlying support for level 16. A wing 48 facilitates manual turning at one end, and a resilient pad 50 carried by a universal joint fitting 52 at the other end of the elongate threaded member 46 to facilitate clamping to members of different cross sectional shapes. When used to clamp to a cylindrical scaffolding member 34', resilient pad distorts to conform to a cylindrical shape to enhance frictionally gripping.

Referring now to FIGS. 3 and 4, another form of the preferred embodiment 10' of the present invention is shown having a mounting assembly 38' which, like the first form of the preferred embodiment 10, is also capable of use regardless of whether attached to a member extending in a vertical direction, such as scaffolding member 34, FIGS. 3 and 4, or to a horizontal member, such as scaffolding member 32, FIGS. 1–3.

In the case of the preferred embodiment 10' shown in FIG. 3 and 4, the level holding assembly 14' comprises one or more pegs 58 and 60 for supporting one or more elongate levels 16 in different orientations relative to the assembly 14'. The pegs 58 and 60 are cantilever mounted to an elongate base member 62. The pegs 58 are received through the weight reduction holes to supportively hang the levels 16, and have distal ends which are enlarged relative to the ends adjacent the base 62 to reduce slippage of the level 16 off the distal end. The pegs 58 and 60 are preferably attached to the base 62 by being integrally formed therewith, and each preferably has sufficient length to support a plurality of levels 16. The capacity to independently mount a plurality of levels, the lengths of the levels decrease along the length of the base so a peg, such as peg 58, does not interfere with the hanging of a level on a higher peg, such as peg 60, when the releasable holding assembly 14' is releasably attached to a vertical member 34.

The mounting assembly 38', like mounting assembly 38, is capable of mounting the level holding assembly 14' to a horizontal scaffolding or other member 32, such as at location 64 shown in broken line in FIG. 3. It is preferably in the form of a C-shaped clamp 66, defined in part by base 62. A pair of resilient arms 64 and 66 are nonpivotally secured to a side of the base 62 opposite the side to which the pegs 58 and 60 are mounted in opposed relationship to resiliently hold therebetween a scaffolding member. Because the arms 64 and 66 are not pivotally interconnected their relative nonpivotal movement is in a direction which is more normal to the scaffolding members for improved clamping ability.

The base 62 is preferably elongate and the opposed arms 64 and 66 are coextensive with the base and are integrally formed together therewith of a suitable impact resilient plastic or a suitable molded metal of sufficient resiliency and strength.

As seen best in FIG. 4, the C-shaped clamp is adapted for attachment to cylindrical members by virtue of a cylindrical portion of each of arms 64 and 66 interposed between the base 62 and distal planar sections 64 and 66' that are adapted to interface with a board-like scaffolding member, such as scaffolding member 32, FIG. 4.

The level holding assembly 14' is preferably used in conjunction with mating assembly 84'. However, if should be appreciated that the mating assembly 38' could be employed with the level holding assembly 14 of FIGS. 1 and 2.

While a detailed description of the preferred embodiment of the invention has been given, it should be appreciated that many variations can be made thereto without departing from the scope of the invention as set forth in the appended claims.

We claim:

1. A level holder, comprising:
    a level holding assembly for selectively supporting an elongate level in two different orientations relative to the assembly including
        a base member,
        a peg with a fixed end, a distal end and an elongate substantially straight body extending therebetween for supportive hanging of the level.
        means at the distal end extending in at least two directions transverse to the elongate, substantially straight body and generally parallel to send two different orientations, respectively, to block sliding removal of the level off the distal end, and
        means for attaching the peg to the base; and
    a mounting assembly for selectively attaching said level holding assembly to scaffolding members which extend in two transverse directions relative to the level holding assembly respectively associated with said two different orientations to enable the level holding assembly to support the elongate level in a substantially vertical orientation regardless of the direction of the scaffolding member to which the mounting assembly is attached.

2. The level of pegs for hanging support of a plurality of holding means includes
    a plurality of pegs for hanging support of a plurality of levels, respectively,
    a base member, and
    means for mounting said plurality of pegs to the base member.

3. The level holder of claim 1 in which said mounting assembly includes a pair of rectilinear arms for selectively clamping the level holding assembly to a rectilinear scaffolding member.

4. A level holder, comprising:
    a level holding assembly for supporting an elongte level in a vertical orientation; and
    a mounting assembly for releasably mounting the level holding assembly to a scaffolding member including a generally C-shaped clamp having
        a base with a pair of opposite sides,
        means for attaching the level holding assembly to one side of the pair of opposite sides of the base,
        a pair of resilient arms each including a curved section for mating engagement with a curved scaffolding member and an elongate, substantially straight section for mating engagment with a board-like, rectilinear scaffolding member, and
        means for nonpivotally securing the pair of resilient arms to the base in spaced, opposed relationship to resiliently hold therebetween said scaffolding member.

5. The level holding of claim 4 in which said level holding assembly includes
    a peg with a fixed end, a distal end and an elongate substantially straight body extending therebetween, and
    means for mounting the peg to the other one of the pair of opposite sides of the base and extending away from the pair of arms.

6. The level holder of claim 5 in which said peg has a length sufficient to support a plurality of levels in side by side relationship.

7. The level holder of claim 5 in which said peg has an end adjacent the base of the C-shaped clamp, and
    a distal end which is enlarged relative to the base adjacent end to reduce slippage of a level off the distal end.

8. The level holder of claim 5 in which said means for mounting the peg includes a joint which is integral with the mounting assembly.

9. The level holder of claim 4 in which the level holding assembly and mounting assembly are integrally formed together.

10. The level holder of claim 4 in which the pair of resilient arms are coextensive with the base.

11. The level holder of claim 4 in which the level holding assembly includes a lateral member for providing underlying support for the elongate level.

12. The level holder of claim 11 in which said level holding assembly includes
    at least one upright member for providing lateral support for an elongate level receiving underlying support from said lateral member, and
    means for securing together the lateral member and the upright member.

13. The level holder of claim 4 in which said level holding assembly includes means for independently holding a plurality of levels.

14. The level holder of claim 4 in which said level holding assembly includes a plurality of cup shaped members levels, respectively.

15. The level holder of claim 4 in which said level holding assembly includes a plurality of elongate, substantially sraight pegs for individual hanging support of a plurality of levels.

16. The level holder of claim 15 in which
the base has an elongate body, and
said plurality of pegs are located along the length of the body and have graduated lengths.

* * * * *

UNITED STATES PATENT AND TRADEMARK OFFICE
CERTIFICATE OF CORRECTION

PATENT NO. : 5,100,089
DATED : March 31, 1992
INVENTOR(S) : Charles E. McLemore, Jr. et al.

Page 1 of 2

It is certified that error appears in the above-indentified patent and that said Letters Patent is hereby corrected as shown below:

Col. 1, line 1, change "TECHNICAL BAOKGROUND" to -- TECHNICAL BACKGROUND --

Col. 2, lines 5-6, delete "iven" and insert -- horizontal surface and only if the wood screw fasteners can be driven -- line 8, change "ar" to -- mar --

Col. 3, line 5, after "lateral" insert -- member. --

Col. 4, line 14, change "20," to --20'--

Col. 4, line 14, after "the" second occurrence, insert --underlying support member 18 when the level holding assemblies-- line 32, after "gap" insert -- therebetween for receipt of either the horizontal member 32 or -- lines 33-34, after "an" insert -- elongate -- line 36, after "tially" delete -- , --

UNITED STATES PATENT AND TRADEMARK OFFICE
CERTIFICATE OF CORRECTION

PATENT NO. : 5,100,089
DATED : March 31, 1992
INVENTOR(S) : Charles E. McLemore, Jr. et al.

It is certified that error appears in the above-indentified patent and that said Letters Patent is hereby corrected as shown below:

Col. 5, line 29, after "64" insert - , - line 67, delete "level of pegs for hanging support of a plurality of holding" and insert - level holder of claim 1 in which said level holding -

Col. 6, line 68, after "member" insert - for individually holding in an upright position a plurality of -

Signed and Sealed this

Thirty-first Day of May, 1994

Attest:

BRUCE LEHMAN

Attesting Officer     Commissioner of Patents and Trademarks